(12) United States Patent
Choi et al.

(10) Patent No.: US 11,590,943 B2
(45) Date of Patent: Feb. 28, 2023

(54) CONTROL SYSTEM OF BRAKE-BY-WIRE DEVICE

(71) Applicants: Hyundai Motor Company, Seoul (KR); Kia Motors Corporation, Seoul (KR)

(72) Inventors: Hae Ryong Choi, Seoul (KR); Dong Yoon Hyun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 194 days.

(21) Appl. No.: 17/118,419

(22) Filed: Dec. 10, 2020

(65) Prior Publication Data
US 2021/0394726 A1 Dec. 23, 2021

(30) Foreign Application Priority Data
Jun. 17, 2020 (KR) .................. 10-2020-0073330

(51) Int. Cl.
*B60T 8/1755* (2006.01)
*B60G 17/016* (2006.01)
*B60G 17/0185* (2006.01)

(52) U.S. Cl.
CPC ........ *B60T 8/1755* (2013.01); *B60G 17/0162* (2013.01); *B60G 17/0185* (2013.01);
(Continued)

(58) Field of Classification Search
CPC ............... B60T 8/1755; B60T 8/17551; B60T 2260/06; B60T 2270/30; B60T 2270/402;
(Continued)

(56) References Cited

U.S. PATENT DOCUMENTS 6,657,539 B2 * 12/2003 Yamamoto ............ B60R 21/013
340/439
2010/0025131 A1 2/2010 Gloceri et al.
(Continued)

FOREIGN PATENT DOCUMENTS

CN 101561353 B * 10/2010
CN 108909828 A * 11/2018
(Continued)

OTHER PUBLICATIONS

Xiang, et al., Automobile Brake-by-Wire Control System Design and Analysis; Jan. 2008; vol. 57, Issue 1; pp. 140-144; (https://ieeexplore.ieee.org/document/4358463) (Year: 2008).*
Zhao, et al., Vehicle Lateral Control and Yaw Stability Control through Differential Braking; Jul. 13, 2006; IEEE International Symposium on Industrial Electronics; pp. 384-388 (https://ieeexplore.ieee.org/document/4077955) (Year: 2006).*

*Primary Examiner* — Atul Trivedi
(74) *Attorney, Agent, or Firm* — Morgan, Lewis & Bockius LLP

(57) ABSTRACT

A control system of a BBW device may include brake-by-wire (BBW) devices provided to each of wheels of a vehicle to perform a braking control or a suspension control of the vehicle, sensors configured for detecting an operating state of each of the BBW devices, and controllers connected to each of the BBW devices to control a corresponding BBW device among the BBW devices, in which the controllers are configured to determine whether the sensors fail according to data received from the sensors, and when determining that any a sensor among the sensors fails, the controllers turn off any a BBW device of the BBW devices which is a target detected by the failed sensor, and perform the braking control or the suspension control of the BBW devices based on a traveling state of the vehicle.

20 Claims, 3 Drawing Sheets

(52) U.S. Cl.
CPC ...... *B60T 8/17551* (2013.01); *B60G 2204/62* (2013.01); *B60G 2400/0523* (2013.01); *B60G 2400/208* (2013.01); *B60G 2400/41* (2013.01); *B60G 2600/08* (2013.01); *B60G 2600/182* (2013.01); *B60G 2800/016* (2013.01); *B60G 2800/244* (2013.01); *B60G 2800/70* (2013.01); *B60G 2800/85* (2013.01); *B60G 2800/912* (2013.01); *B60G 2800/94* (2013.01); *B60T 2220/00* (2013.01); *B60T 2220/04* (2013.01); *B60T 2240/00* (2013.01); *B60T 2250/03* (2013.01); *B60T 2260/06* (2013.01); *B60T 2270/30* (2013.01); *B60T 2270/402* (2013.01); *B60T 2270/404* (2013.01); *B60T 2270/82* (2013.01)

(58) Field of Classification Search
CPC ......... B60T 2270/404; B60T 2270/604; B60T 2270/82; B60T 2220/00; B60T 2220/04; B60T 2240/00; B60T 2250/03; B60G 17/0157; B60G 17/0162; B60G 17/0185; B60G 2800/016; B60G 2800/244; B60G 2800/70; B60G 2800/85; B60G 2800/912; B60G 2800/94; B60G 2600/08; B60G 2600/182; B60G 2204/62; B60G 2400/0523; B60G 2400/208; B60G 2400/41

USPC .......................................................... 701/39
See application file for complete search history.

(56) References Cited

U.S. PATENT DOCUMENTS

| | | | |
|---|---|---|---|
| 2015/0224845 A1* | 8/2015 | Anderson | B60G 17/019 701/37 |
| 2016/0059660 A1* | 3/2016 | Brady | B60G 17/08 701/37 |
| 2018/0093571 A1* | 4/2018 | Hall | B60L 7/18 |
| 2018/0154777 A1* | 6/2018 | Hall | B60L 7/18 |
| 2019/0248365 A1* | 8/2019 | Kim | B60W 30/09 |
| 2020/0173548 A1* | 6/2020 | Han | F16H 63/50 |

FOREIGN PATENT DOCUMENTS

| | | | | |
|---|---|---|---|---|
| CN | 110254405 A | * | 9/2019 | ............... B60T 8/17 |
| EP | 4019348 A1 | * | 6/2022 | |
| GB | 2531776 A | * | 5/2016 | ................. B60T 7/12 |
| GB | 2531777 A | * | 5/2016 | ................. B60T 1/10 |
| JP | H10-154002 A | | 6/1998 | |
| JP | 2005-532215 A | | 10/2005 | |
| KR | 10-2013-0000996 A | | 1/2013 | |
| KR | 10-1894382 B1 | | 9/2018 | |
| WO | WO-2014145018 A2 | * | 9/2014 | .......... B60G 11/265 |
| WO | WO-2015197267 A1 | * | 12/2015 | ......... B60G 17/0163 |
| WO | WO-2019218097 A1 | * | 11/2019 | ............. B60C 23/04 |

* cited by examiner

CONTROL SYSTEM OF BRAKE-BY-WIRE DEVICE

CROSS-REFERENCE TO RELATED APPLICATION

The present application claims priority to Korean Patent Application No. 10-2020-0073330 filed on Jun. 17, 2020, the entire contents of which is incorporated herein for all purposes by this reference.

BACKGROUND OF THE INVENTION

Field of the Invention

The present invention relates to a control system of a sensor which detects the operating state of a BBW device.

Description of Related Art

A brake device for a vehicle is a device which decelerates or stops a traveling vehicle or generates a braking force for maintaining the stop state of the vehicle, and upon deceleration, the kinetic energy of the vehicle is converted into thermal energy by mechanical friction and the friction heat thereof is emitted to the atmosphere, implementing the braking. The brake device for the vehicle includes a drum-type hydraulic brake and a disk-type hydraulic brake, and among them, the disk-type hydraulic brake is designed to obtain a braking force by forcibly pressing a disk rotating together with a wheel with frictional pads at both sides instead of a drum. However, the hydraulic brake requires a mechanical element connected to the brake pedal of a driver seat, a hydraulic piping, an element for controlling hydraulic pressure, and the like and thus has a complicated configuration, and accordingly, an electro-mechanical brake (EMB) is developed and used to simplify the configuration of the brake device.

Furthermore, a suspension device is a device which effectively blocks irregular inputs of the road surface generated while the vehicle travels to provide a comfortable ride to a passenger, and secure a stability of the vehicle when the vehicle turns and brakes. An active geometry control suspension system which actively adjusts the suspension of the vehicle according to the vehicle state is applied to the vehicle.

A brake-by-wire (BBW) device including an electro-mechanical brake and a controller configured for controlling the same is applied to each wheel of the vehicle. The BBW devices including the active geometry control suspension system are applied to a rear wheel of the vehicle. However, since the BBW device includes a unique controller configured for controlling one wheel and a sensor for detecting the state of one wheel, there is a problem in that it is difficult to control the corresponding wheel if the controller and the sensor fail. If the sensor fails, the BBW device itself is normal but the controller does not confirm the state of the wheel for controlling the BBW device, which causes a problem in that it is difficult to control the vehicle.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a control system of a BBW device configured for safely controlling a vehicle if a sensor provided to each wheel of the vehicle fails.

Various aspects of the present invention are directed to providing a control system of a BBW device configured for controlling BBW devices to secure the stability of a vehicle if a sensor fails in a state where the vehicle is being steered.

Provided is a control system of a BBW device according to various exemplary embodiments of the present invention. The control system of the BBW device includes: brake-by-wire (BBW) devices provided to each of wheels of a vehicle to perform a braking control or a suspension control of the vehicle, sensors configured for detecting an operating state of each of the BBW devices, and controllers connected to each of the BBW devices to control a corresponding BBW device among the BBW devices, in which the controllers are configured to determine whether the sensors fail according to data received from the sensors, and when determining that any a sensor among the sensors fails, the controllers turn off any one of the BBW devices which is a target detected by the failed sensor, and perform the braking control or the suspension control of the BBW devices based on a traveling state of the vehicle.

According to the exemplary embodiment of the present invention, each of the BBW devices includes: an electro-mechanical brake configured for performing braking of the vehicle, a suspension device configured for performing the suspension control of the vehicle, a motor configured for providing a driving force toward the electro-mechanical brake or the suspension device, a first clutch configured for selectively connecting the electro-mechanical brake with the motor, and a second clutch configured for selectively connecting the suspension device with the motor.

After any one of the BBW devices is turned off, the controller controls the BBW devices other than the turned-off BBW device based on the traveling state of the vehicle.

According to the exemplary embodiment of the present invention, the traveling state of the vehicle includes at least one state among vehicle states in which the vehicle is in an understeer, an oversteer, and a normal state.

According to the exemplary embodiment of the present invention, if the traveling state of the vehicle is the normal state, the controller secures the stability of the vehicle through the braking control of the BBW devices other than the turned-off BBW device.

According to the exemplary embodiment of the present invention, if the traveling state of the vehicle is an understeer state, the controller secures the stability of the vehicle through the braking control of the BBW devices other than the turned-off BBW device.

According to the exemplary embodiment of the present invention, if the traveling state of the vehicle is an oversteer state, the controller secures the stability of the vehicle through the suspension control of BBW devices attached to a rear wheel of the wheels among the BBW devices according to a steering direction of the vehicle.

According to the exemplary embodiment of the present invention, if the steering direction is a turn-right direction of the vehicle, the controllers are configured to perform the suspension control of the BBW device disposed at a left side of the rear wheel, and if the steering direction is a turn-left direction of the vehicle, the controllers are configured to perform the suspension control of the BBW device disposed at a right side of the rear wheel.

According to the exemplary embodiment of the present invention, if the BBW device, which is a target of the suspension control, is the turned-off BBW device, the controller turns on the turned-off BBW device to perform the suspension control.

According to the exemplary embodiment of the present invention, if there is a driver's braking control request, the controllers preferentially perform the braking control prior to the suspension control of the BBW devices.

According to the exemplary embodiment of the present invention, each of the controllers determines a reference yaw rate according to the vehicle state measured by the sensors, and determines the traveling state of the vehicle by comparing the reference yaw rate with a measured yaw rate actually measured by a yaw rate sensor.

According to the exemplary embodiment of the present invention, each of the controllers determines whether a value obtained by multiplying a difference value obtained by subtracting the reference yaw rate from the measured yaw rate by a steering angle of the vehicle is positive or negative to determine the traveling state of the vehicle.

According to the exemplary embodiment of the present invention, to secure the stability of the vehicle, the controller may perform the braking control and the suspension control of the BBW devices based on whether the sensor part fails and the traveling state of the vehicle. The controller may turn off the BBW device at the side where the sensor part fails, preventing the control of the wheels based on the wrong data.

According to the exemplary embodiment of the present invention, the controller may preferentially perform the braking control based on the driver's braking request. In the absence of the driver's braking request, the controller may be configured to control the BBW devices based on the state and traveling state of the vehicle.

According to the exemplary embodiment of the present invention, the controller may perform the control for securing the stability of the vehicle with the highest priority, and control the BBW device attached with the failed sensor part for securing the stability of the vehicle upon sudden steering.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
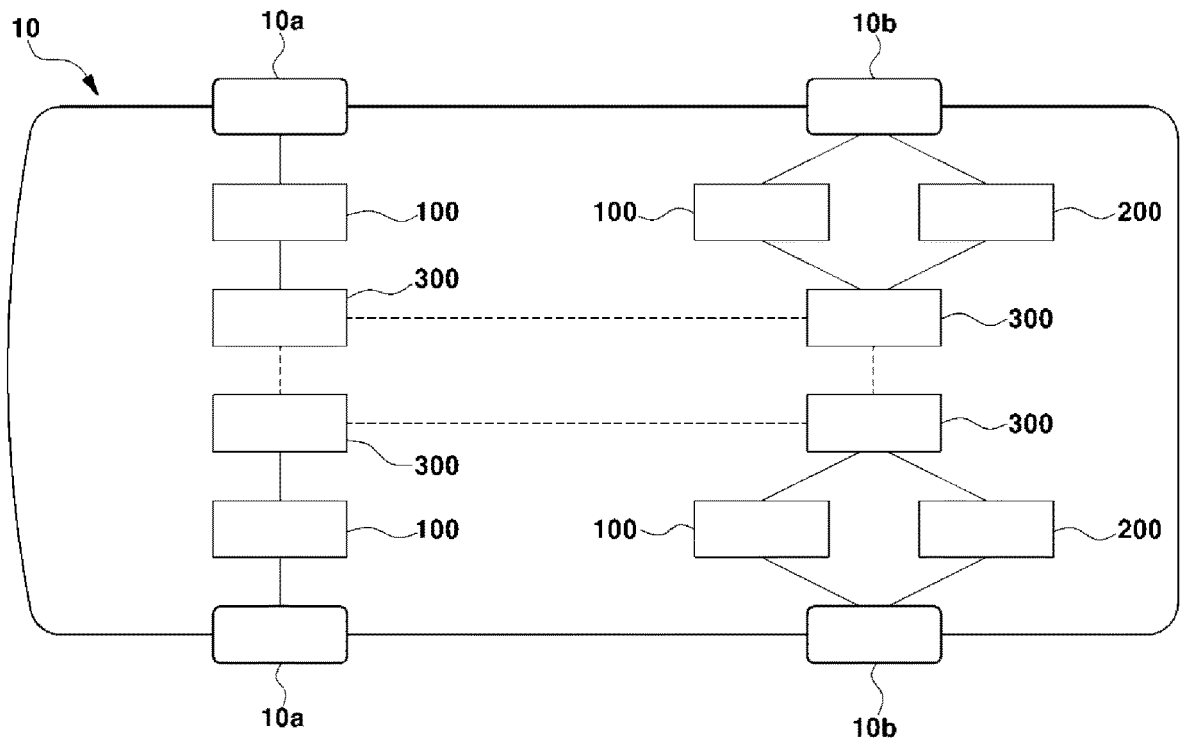
FIG. 1 is a diagram explaining a vehicle to which a BBW device according to various exemplary embodiments of the present invention is applied.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Advantages and features of the present invention, and a method for achieving them will be clarified with reference to exemplary embodiments described later in detail together with the accompanying drawings. However, the present invention is not limited to the exemplary embodiments included below but may be implemented in various different forms, and only the exemplary embodiment of the present inventions allow the present invention of the present invention to be complete, and are provided to completely inform those skilled in the art to which various exemplary embodiments of the present invention pertains of the scope of the present invention, and the present invention is only defined by the scope of the claims. The same reference numerals throughout the specification denote the same components.

The terms such as " . . . part", " . . . unit", and " . . . module" described in the specification mean a unit which processes at least one function or operation, which may be implemented in hardware or software or a combination of hardware and software.

Furthermore, in the exemplary embodiment, the names of the components are classified as first, second, and the like to distinguish them because the names of the components thereof are the same, and are not necessarily limited to the order in the following description.

The detailed descriptions illustrate the present invention. Furthermore, the aforementioned contents illustrate and describe exemplary embodiments of the present invention, and the present invention may be used in various other combinations, modifications, and environments. That is, changes or modifications of the present invention are possible within the scope of the concept of the present invention included in the exemplary embodiment, the scope equivalent to the included disclosure, and/or the scope of the technology or knowledge in the art. The described exemplary embodiments describe the best mode for implementing the technical spirit of the present invention, and various changes required in specific application fields and utilizes of the present invention are also possible. Accordingly, the detailed descriptions of the present invention are not intended to limit the present invention to the included exemplary embodiments. Furthermore, the appended claims may be construed to include other exemplary embodiments.

FIG. 1 is a diagram explaining a vehicle to which a BBW device according to various exemplary embodiments of the present invention is applied.

Referring to FIG. 1, an electro-mechanical brake (EMB) 100 may be applied to each of a front wheel 10a and a rear wheel 10b mounted on a vehicle 10. The electro-mechanical brake 100 may refer to a brake which obtains a braking force by pressing a frictional pad using a mechanical mechanism driven by an electric motor unlike a general hydraulic brake. The electro-mechanical brake may press a disk disposed on each of the front wheel 10a and the rear wheel 10b using a driving force generated by a motor to be described later, and may perform braking of the vehicle 10 by pressing the disk. The electro-mechanical brake 100 may have a simpler structure and a higher response speed than those of the hydraulic brake, and perform a more precise control than that of the hydraulic brake, improving braking safety performance.

An active suspension device 200 may be applied to the rear wheel 10b of the vehicle 10. In various exemplary embodiments of the present invention, the active suspension device 200 may refer to an active geometry control suspension system. The active suspension device 200 may change the geometry of a rear suspension for the vehicle using an electrically operated motor, and increase the roll steer amount upon turning, improving a tread force of the rear wheel 10b.

An electro-mechanical brake system having a suspension control function according to the exemplary embodiment of the present invention may include one motor configured for simultaneously controlling the electro-mechanical brake 100 and the active suspension device 200, and may include a controller 300 for controlling any one of the electro-mechanical brake 100 and the active suspension device 200. That is, one controller 300 may simultaneously control the electro-mechanical brake 100 and the active suspension device 200 disposed on the rear wheel 10b of the vehicle 10. The controller 300 may be provided to the vehicle 10, to which the electro-mechanical brake 100 is applied, for each wheel, and the controller 300 provided to the rear wheel 10b may simultaneously control the electro-mechanical brake 100 and the suspension device 200. The four controllers 300 may be electrically connected to each other. If any one of the four controllers 300 fails, the normally operating controller 300 may replace the function of the failed controller 300.

According to the exemplary embodiment of the present invention, the controller 300 for controlling the electro-mechanical brake 100 and the controller 300 for controlling the active suspension device 200 may be integrated. Accordingly, the number of controllers 300 mounted on the vehicle 10 may be reduced. Furthermore, according to the exemplary embodiment of the present invention, as one motor provides a driving force to each of the electro-mechanical brake 100 and the active suspension device 200, the number of motors mounted on the vehicle 10 may be reduced.

Figure 2:
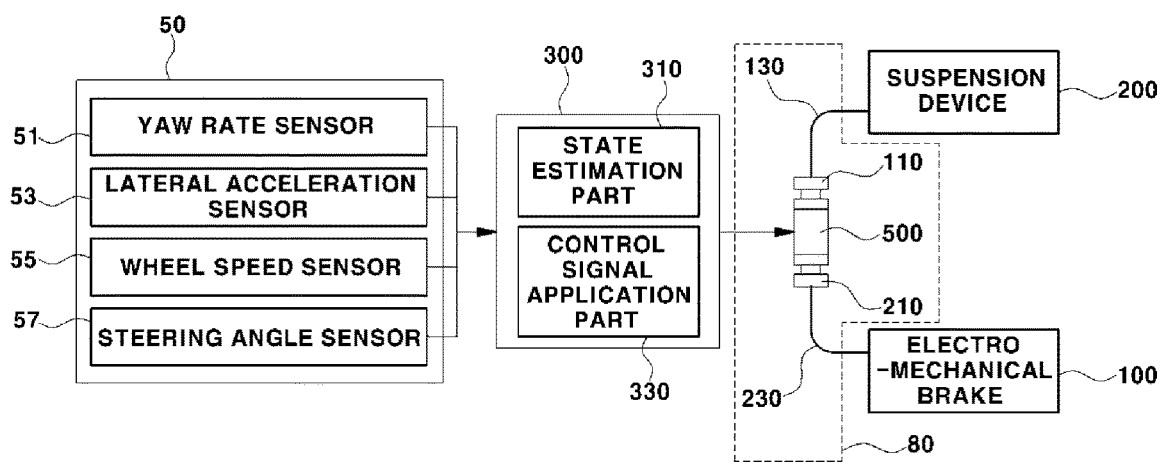
FIG. 2 is a diagram illustrating a control system of the BBW device according to the exemplary embodiment of the present invention.

FIG. 2 is a diagram illustrating a control system of the BBW device according to the exemplary embodiment of the present invention.

Referring to FIG. 1 and FIG. 2, the electro-mechanical brake system 1 having a suspension control function may include a sensor part 50, the controller 300, and a BBW device 80.

The sensor part 50 may include a yaw rate sensor 51, a lateral acceleration sensor 53, a wheel speed sensor 55, and a steering angle sensor 57. The sensor part 50 may detect the operating state of the BBW device 80. At the instant time, the operating state of the BBW device 80 may include a force (a clamping force) applied to the wheels 10a, 10b by the BBW device 80, the speed and steering of the wheels 10a, 10b, and the like. The sensor part 50 may be disposed on each of the wheels 10a, 10b. The vehicle information detected by the sensor part 50 may be transmitted to the controller 300.

The yaw rate sensor 51 may detect the speed at which a rotational angle (a yaw angle) changes around a perpendicular line passing through the center portion of the vehicle. The yaw rate sensor 51 may detect a change in the behavior of the vehicle in a yaw direction of the vehicle due to a steering change, braking, or the like.

The lateral acceleration sensor 53 may detect the acceleration of the vehicle which fluctuates toward the lateral direction thereof. As an example, the lateral acceleration sensor 53 may detect a change in the lateral behavior of the vehicle due to a steering change, braking, or the like.

The wheel speed sensor 55 may detect a change in the vehicle speed of the vehicle in the longitudinal direction thereof. The wheel speed sensor 55 may be disposed on the front wheel and the rear wheel of the vehicle, respectively. That is, the wheel speed sensor 55 may detect the wheel speed of the front wheel and the wheel speed of the rear wheel, respectively.

The steering angle sensor 57 may detect a change in the steering of the vehicle. The fact that the steering angle sensor 57 detects the steering change of the vehicle may mean that the driver of the vehicle has changed the steering. As an example, the steering angle sensor 57 may detect whether the vehicle is suddenly steered.

Unlike the aforementioned example, the sensor part 50 may include a camera, a radar, a Light Detection and Ranging (LiDAR), and the like for determining whether the vehicle is in a sudden steer state or sudden braking state. Furthermore, the sensor part 50 may include a brake position sensor (BPS) configured for determining a driver's braking intention.

The controller 300 may estimate the state of the vehicle based on the vehicle information transmitted by the sensor part 50, and output a control signal for controlling the BBW device 80 based on the state of the vehicle. The controller 300 may include a state estimation portion 310 which estimates the state of the vehicle by analyzing the information related to the vehicle transmitted by the sensor part 50, and a control signal application portion 330 which outputs the control signal based on the state of the vehicle.

The state estimation portion 310 may determine whether the vehicle currently travels normally, whether to perform a sudden steering or to perform a sudden braking. The state estimation portion 310 may transmit a state signal related to the current state of the vehicle to the control signal application portion 330.

The control signal application portion 330 may output a first control signal for generating the output required for the motor 500 and a second control signal for physically coupling a first clutch 110 and a second clutch 210 with the motor 50. The control signal application portion 330 may apply the second control signal to any one of the first clutch 110 and the second clutch 210 based on the state signal of the vehicle. If the second control signal is applied to the first clutch 110, the first clutch 110 may be physically coupled to the shaft of the motor 500. Accordingly, the rotational force of the motor 500 may be transferred to the electro-mechanical brake 100. If the second control signal is applied to the second clutch 210, the second clutch 210 may be physically coupled to the shaft of the motor 500. Accordingly, the rotational force of the motor 500 may be transferred to the active suspension device 200.

The control signal application portion 330 may control the BBW devices 80 attached to the respective wheels 10a, 10b if the sensor part 50 fails, securing the stability of the vehicle. If it is determined that any one sensor part 50 of the sensor parts 50 disposed on each of the wheels 10a, 10b fails, the control signal application portion 330 may turn off any one of the BBW devices 80 which are the targets detected by the failed sensor parts 50. That is, the control signal application portion 330 may turn off the BBW devices 80 disposed on the wheels 10a, 10b in which the failed sensor part 50 is disposed. Thereafter, the control signal application portion 330 may perform a braking or suspension control of the BBW devices 80 based on the traveling state of the vehicle. The traveling state of the vehicle may mean whether a current trend of the vehicle is an understeer, oversteer, or normal state.

After any one of the BBW devices 80 is turned off, the control signal application portion 330 may control the remaining BBW devices 80 other than the BBW device 80 turned off based on the traveling state of the vehicle, securing the stability of the vehicle. That is, the control signal application portion 300 may secure a stability of the vehicle through the braking control or suspension control of the remaining BBW devices 80. However, when inevitably requiring the braking control or suspension control of the turned-off BBW device 80, the control signal application portion 300 may turn on the turned-off BBW device 80.

As an example, if the traveling state of the vehicle is the normal state or the understeer state, the control signal application portion 330 may secure a stability of the vehicle through the braking control of the BBW devices 80 other than the turned-off BBW device 80.

As an example, if the traveling state of the vehicle is the state of the oversteer, the control signal application portion 330 may secure a stability of the vehicle through the suspension control of the BBW devices 80 attached to the rear wheel among the BBW devices 80 according to the steering direction of the vehicle. At the instant time, if the turned-off BBW device 80 is attached to the rear wheel, the control signal application portion 330 may perform the suspension control of the turned-off BBW device 80.

According to the exemplary embodiment of the present invention, to secure the stability of the vehicle, the controller 300 may perform the braking control and suspension control of the BBW devices 80 based on whether the sensor part 50 fails and the traveling state of the vehicle. The controller 300 may turn off the BBW device 80 at the side where the sensor portion 50 fails, preventing the control of the wheels 10a, 10b based on the wrong data.

Figure 3:
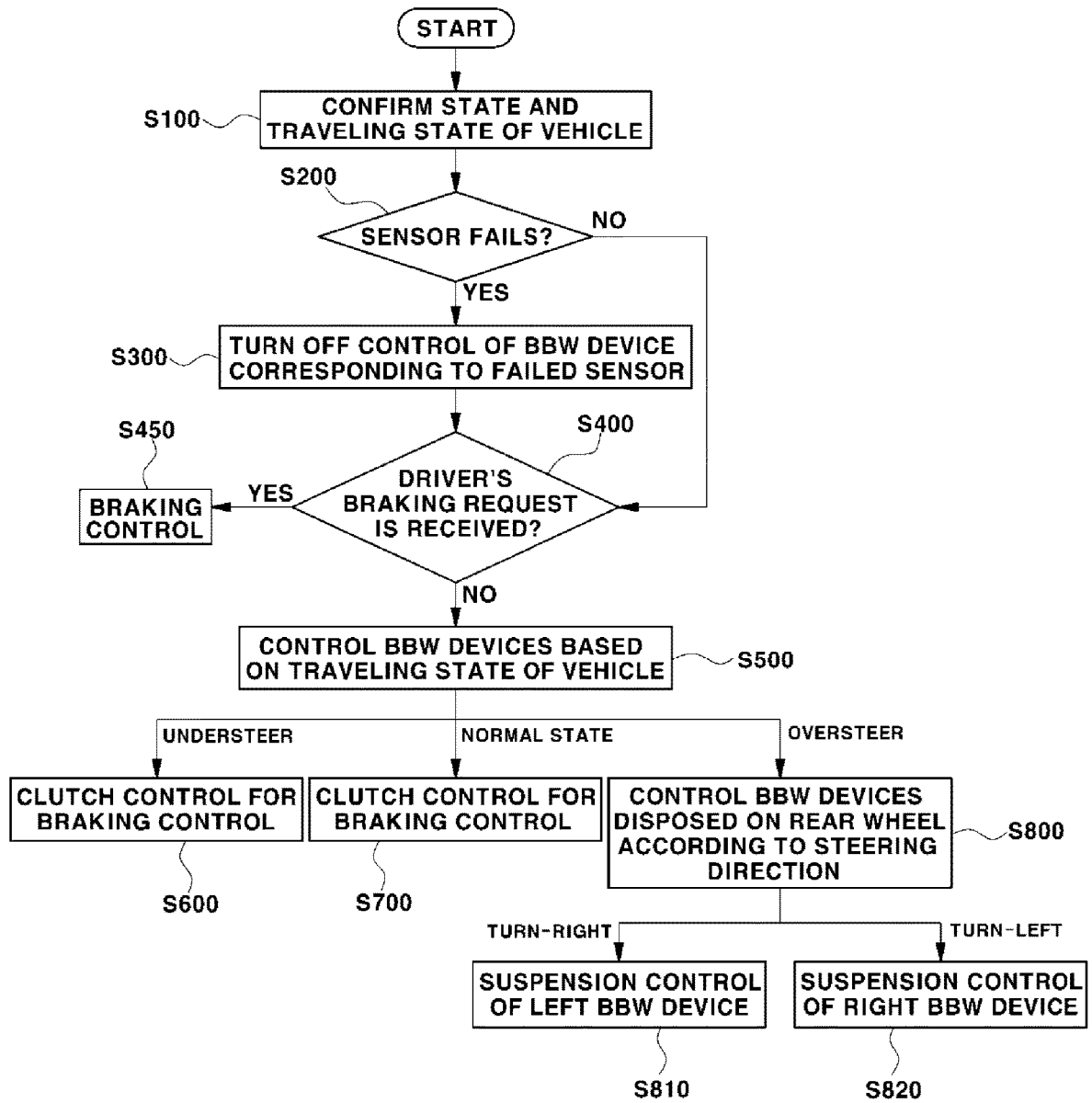
FIG. 3 is a flowchart illustrating a control method of the BBW device according to the exemplary embodiment of the present invention.
Figure 4:
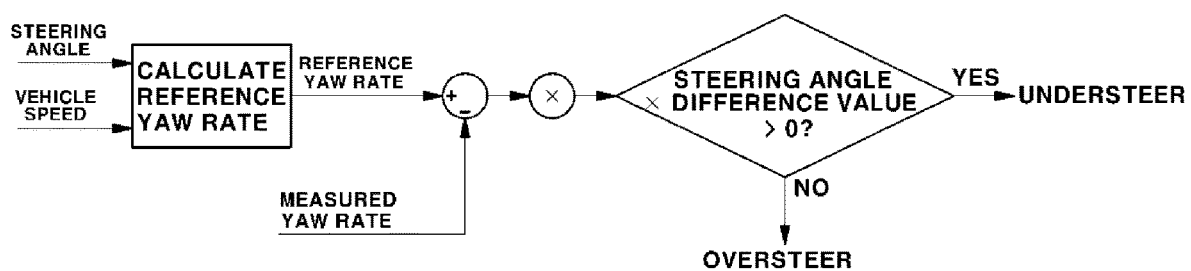
FIG. 4 is a diagram explaining logic for determining a traveling state of a vehicle according to the exemplary embodiment of the present invention.

FIG. 3 is a flowchart illustrating a control method of the BBW device according to the exemplary embodiment of the present invention, and FIG. 4 is a diagram explaining logic for determining the traveling state of the vehicle according to the exemplary embodiment of the present invention.

Referring to FIG. 3 and FIG. 4, the sensor parts may transmit data measuring wheel data to the controller, and the controller may confirm the state and traveling state of the vehicle based on the received data. The state of the vehicle may mean the steering angle of the vehicle, the yaw rate of the vehicle, the vehicle speed, and the acceleration of the vehicle based on the data measured by the sensor parts. The traveling state of the vehicle means the propensity of the vehicle being steered and may mean whether the traveling state of the vehicle is the understeer, oversteer, or normal state (S100).

The controller may be configured to determine that the sensor part fails based on the data of the sensor parts. The controller may compare the data of the sensor part previously collected in the normal state without failure with the data measured in real time by the sensor part to determine that the corresponding sensor part fails if the data measured in real time by the sensor part exceeds an error range of the previously collected data. The previously-collected data may be previously stored in the controller as data collected as the state of the vehicle is changed (S200).

If it is determined that any one of the sensor parts attached to each of the four wheels fails, the controller may turn off the driving of the BBW device matching the failed sensor part. Accordingly, if the BBW device is controlled based on the data measured by the failed sensor portion, a problem in that the stability of the entire vehicle is lowered may be prevented (S300).

The controller may first perform the braking control of the vehicle if a driver requests the braking. The controller may be configured to determine the driver's braking request based on the data received from the brake position sensor (BPS). If there is a request for generating the pedal effort of the brake from the BPS, the controller may perform the braking control of the BBW device without considering the state and traveling state of the vehicle (S400, S450).

In the absence of the driver's braking request, the controller may be configured to control the BBW devices based on the traveling state of the vehicle. The controller may be configured to determine a reference yaw rate by the steering angle and the vehicle speed measured by the sensor part. The controller may compare the measured yaw rate measured through the yaw rate sensor with the reference yaw rate. After deriving a difference value between the measured yaw rate and the reference yaw rate, the controller may be configured to determine whether a value obtained by multiplying the derived difference value by the steering angle is negative or positive. If the value obtained by multiplying the difference value by the steering angle is positive, the controller may be configured to determine that the traveling state of the vehicle is the state of the understeer, and if the value obtained by multiplying the difference value by the steering angle is negative, the controller may be configured to determine that the traveling state of the vehicle is the oversteer state. If the value obtained by multiplying the difference value by the steering angle is 0, the controller may be configured to determine that the traveling state of the vehicle is the normal state (S500).

If the traveling state of the vehicle is the state of the understeer, the controller may be configured to control the clutch of the BBW device configured for the braking control. The controller may apply a control signal to the clutch configured for selectively connecting the electro-mechanical brake with the motor to couple the electro-mechanical brake with the shaft of the motor. At the instant time, the controller may be configured to control the remaining BBW devices other than the BBW device at the side where the failed sensor part is disposed to perform the braking control (S600).

If the traveling state of the vehicle is the normal state, the controller may be configured to control the clutch of the BBW device configured for the braking control. The controller may apply a control signal to the clutch configured for selectively connecting the electro-mechanical brake with the motor to couple the electro-mechanical brake with the shaft of the motor. At the instant time, the controller may be configured to control the remaining BBW devices other than the BBW device at the side where the failed sensor part is disposed to perform the braking control (S700).

If the traveling state of the vehicle is the state of the oversteer, the controller may be configured to control the clutch of the BBW device disposed on the rear wheel for the suspension control. The controller may apply a control signal to the clutch configured for selectively connecting the active suspension device with the motor to couple the active suspension device with the shaft of the motor (S800).

The controller may be configured to control the BBW devices attached to the rear wheel in consideration of the steering direction of the vehicle. If the vehicle turns to the right, the controller may perform the suspension control of the BBW device attached to the left side of the rear wheel. Accordingly, the stability of the vehicle turning to the right may be secured. If the failed sensor is a sensor attached to the left side of the rear wheel, the controller may turn on the turned-off BBW device again to perform the suspension control (S810).

If the vehicle turns to the left, the controller may perform the suspension control of the BBW device attached to the right side of the rear wheel. Accordingly, the stability of the vehicle turning to the left may be secured. If the failed sensor is a sensor attached to the right side of the rear wheel, the controller may turn on the turned-off BBW device again to perform the suspension control (S820).

According to the exemplary embodiment of the present invention, the controller may preferentially perform the braking control based on the driver's braking request. In the absence of the driver's braking request, the controller may be configured to control the BBW devices based on the state and traveling state of the vehicle.

According to the exemplary embodiment of the present invention, the controller may perform the control of the BBW device even if the sensor part fails. If the vehicle is in the sudden steering state, the suspension control needs to be performed to secure the stability of the vehicle. Accordingly, the controller may turn on the BBW device, which is turned off due to the failure of the sensor portion, again for the suspension control. That is, the controller according to the exemplary embodiment of the present invention may perform the control for securing the stability of the vehicle with the highest priority, and may also control the BBW device attached with the failed sensor part to secure a stability of the vehicle upon the sudden steering.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A control system of brake-by-wire (BBW) devices, the control system comprising:
the BBW devices provided to each of wheels of a vehicle to perform a braking control or a suspension control of the vehicle;
sensors configured for detecting an operating state of each of the BBW devices; and
controllers connected to each of the BBW devices to control a corresponding BBW device among the BBW devices,
wherein each of the BBW devices include a motor configured for providing a driving force to perform the braking control or the suspension control of the vehicle, wherein the controllers are configured to determine whether the sensors fail according to data received from the sensors, and wherein upon determining that a sensor among the sensors fails, the controllers turn off a BBW device of the BBW devices which is a target detected by the failed sensor, and perform the braking control or the suspension control of the BBW devices according to a traveling state of the vehicle.

2. The control system of claim 1, wherein each of the BBW devices includes:
an electro-mechanical brake configured for performing the braking control of the vehicle;
a suspension device configured for performing the suspension control of the vehicle;
the motor configured for providing the driving force toward the electro-mechanical brake or the suspension device;
a first clutch configured for selectively connecting the electro-mechanical brake with the motor; and
a second clutch configured for selectively connecting the suspension device with the motor.

3. The control system of claim 1,
wherein after the BBW device of the BBW devices is turned off, the controllers are configured to control the BBW devices other than the turned-off BBW device according to the traveling state of the vehicle.

4. The control system of claim 1,
wherein the traveling state of the vehicle includes at least one state among vehicle states in which the vehicle is in an understeer, an oversteer, and a normal state.

5. The control system of claim 4,
wherein upon determining that the traveling state of the vehicle is the normal state, the controllers are configured to secure a stability of the vehicle through the braking control of the BBW devices other than the turned-off BBW device.

6. The control system of claim 4,
wherein upon determining that the traveling state of the vehicle is the state of the understeer, the controllers are configured to secure a stability of the vehicle through the braking control of the BBW devices other than the turned-off BBW device.

7. The control system of claim 4,
wherein upon determining that the traveling state of the vehicle is the state of the oversteer, the controllers are configured to secure a stability of the vehicle through the suspension control of BBW devices attached to a rear wheel of the wheels among the BBW devices according to a steering direction of the vehicle.

8. The control system of claim 7,
wherein upon determining that the steering direction is a turn-right direction of the vehicle, the controllers are configured to perform the suspension control of a BBW device disposed at a left side of the rear wheel among the BBW devices, and
wherein upon determining that the steering direction is a turn-left direction of the vehicle, the controllers are configured to perform the suspension control of the BBW device disposed at a right side of the rear wheel among the BBW devices.

9. The control system of claim 8,
wherein upon determining that the BBW device, which is the target of the suspension control, is the turned-off BBW device, the controllers are configured to turn on the turned-off BBW device to perform the suspension control.

10. The control system of claim 7,
wherein upon determining that there is a driver's braking control request, the controllers are configured to perform the braking control prior to the suspension control of the BBW devices.

11. The control system of claim 4, wherein each of the controllers is configured to determine a reference yaw rate according to the vehicle state measured by the sensors, and is configured to determine the traveling state of the vehicle by comparing the reference yaw rate with a yaw rate measured by a yaw rate sensor.

12. The control system of claim 11,
wherein each of the controllers is configured to determine whether a value obtained by multiplying a difference value obtained by subtracting the reference yaw rate from the measured yaw rate, by a steering angle of the vehicle, is positive or negative, to determine the traveling state of the vehicle.

13. The control system of claim 12, wherein each of the controllers is configured to determine that the traveling state of the vehicle is the state of the understeer if the value is positive, the traveling state of the vehicle is the state of the oversteer if the value is negative, and the traveling state of the vehicle is the normal state if the value is zero.

14. A method of controlling brake-by-wire (BBW) devices including a motor configured for providing a driving force to perform a braking control or a suspension control of a vehicle, the method comprising:
determining, by controllers, whether sensors fail according to data received from the sensors, wherein the BBW devices are provided to each of wheels of the vehicle to perform the braking control or the suspension control of the vehicle, the sensors are configured for detecting an operating state of each of the BBW devices, and the controllers are connected to each of the BBW devices to control a corresponding BBW device among the BBW devices; and
upon determining that a sensor among the sensors fails, turning off, by the controllers, a BBW device of the BBW devices which is a target detected by the failed sensor, and performing, by the controllers, the braking control or the suspension control of the BBW devices according to a traveling state of the vehicle.

15. The method of claim 14, including:
after the BBW device of the BBW devices is turned off, controlling, by the controllers, the BBW devices other than the turned-off BBW device according to the traveling state of the vehicle.

16. The method of claim 14, wherein
upon determining that the traveling state of the vehicle is a normal state, securing, by the controllers, a stability of the vehicle through the braking control of the BBW devices other than the turned-off BBW device,
upon determining that the traveling state of the vehicle is a state of an understeer, securing, by the controllers, the stability of the vehicle through the braking control of the BBW devices other than the turned-off BBW device, and
upon determining that the traveling state of the vehicle is a state of an oversteer, securing, by the controllers, the stability of the vehicle through the suspension control of BBW devices attached to a rear wheel of the wheels among the BBW devices according to a steering direction of the vehicle.

17. The method of claim 16,
wherein each of the controllers is configured to determine a reference yaw rate according to the vehicle state measured by the sensors, and is configured to determine the traveling state of the vehicle by comparing the reference yaw rate with a yaw rate measured by a yaw rate sensor, wherein each of the controllers is configured to determine whether a value obtained by multiplying a difference value obtained by subtracting the reference yaw rate from the measured yaw rate by a steering angle of the vehicle, is positive or negative, to determine the traveling state of the vehicle, and wherein each of the controllers is configured to determine that the traveling state of the vehicle is the state of the understeer if the value is positive, the traveling state of the vehicle is the state of the oversteer if the value is negative, and the traveling state of the vehicle is the normal state if the value is zero.

18. The method of claim 14, wherein upon determining that the steering direction is a turn-right direction of the vehicle, the controllers are configured to perform the suspension control of a BBW device disposed at a left side of a rear wheel of the wheels among the BBW devices, and upon determining that the steering direction is a turn-left direction of the vehicle, the controllers are configured to perform the suspension control of the BBW device disposed at a right side of the rear wheel among the BBW devices.

19. The method of claim 14, including:

upon determining that the BBW device, which is the target of the suspension control, is the turned-off BBW device, turning on, by the controllers, the turned-off BBW device to perform the suspension control.

20. The method of claim 14, including:

upon determining that there is a driver's braking control request, performing, by the controllers, the braking control prior to the suspension control of the BBW devices.

* * * * *